Aug. 25, 1953
JOHN HENRY HARDING,
GENERALLY KNOWN AS
HARRY J. HARDING
JACQUARD MECHANISM AND PROCESS
2,649,862
Filed June 17, 1952
6 Sheets—Sheet 1
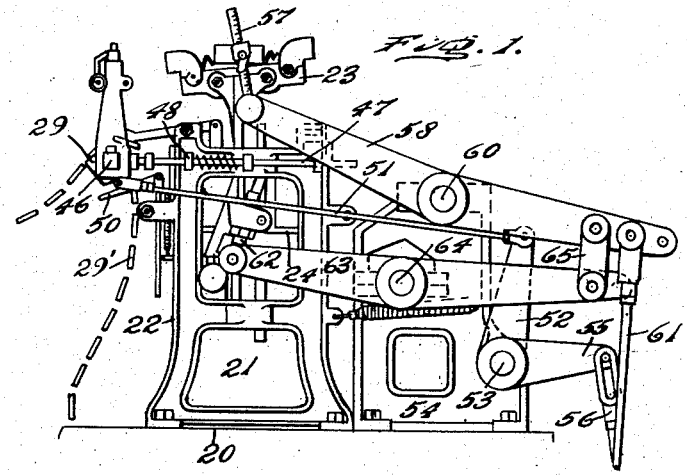
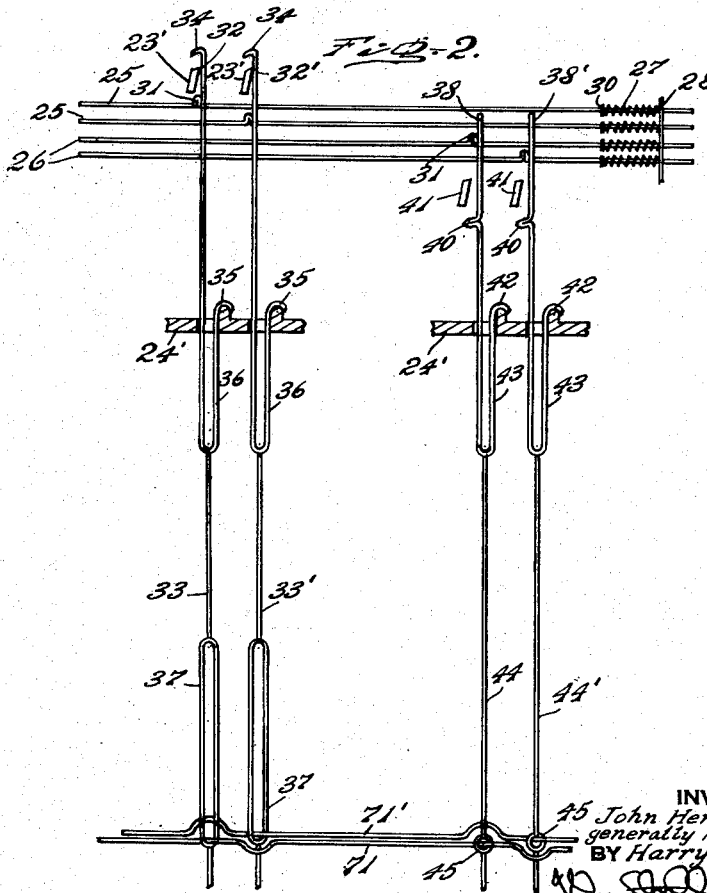
INVENTOR
John Henry Harding
generally known as
BY Harry J. Harding.
ATTORNEYS.

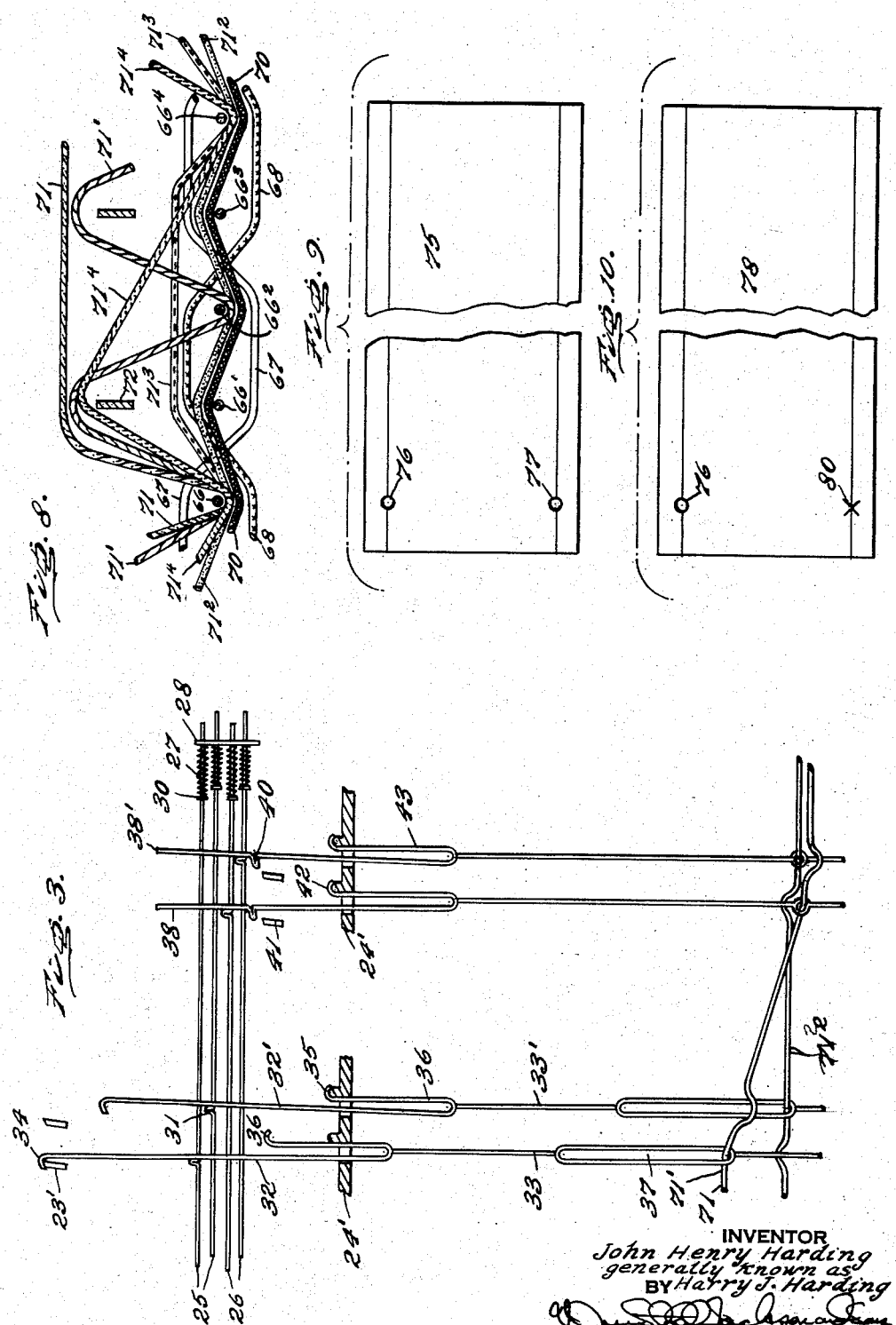

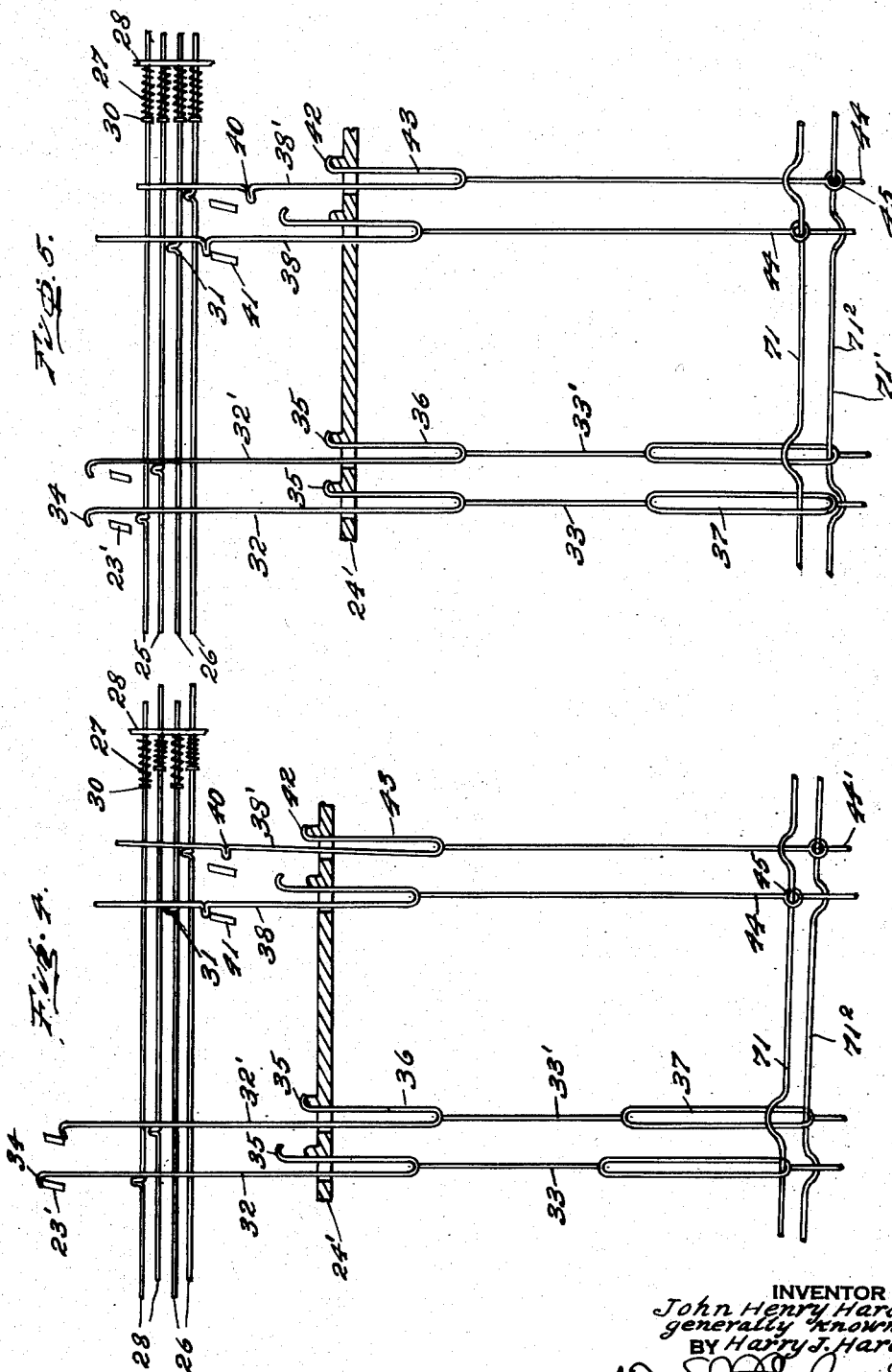

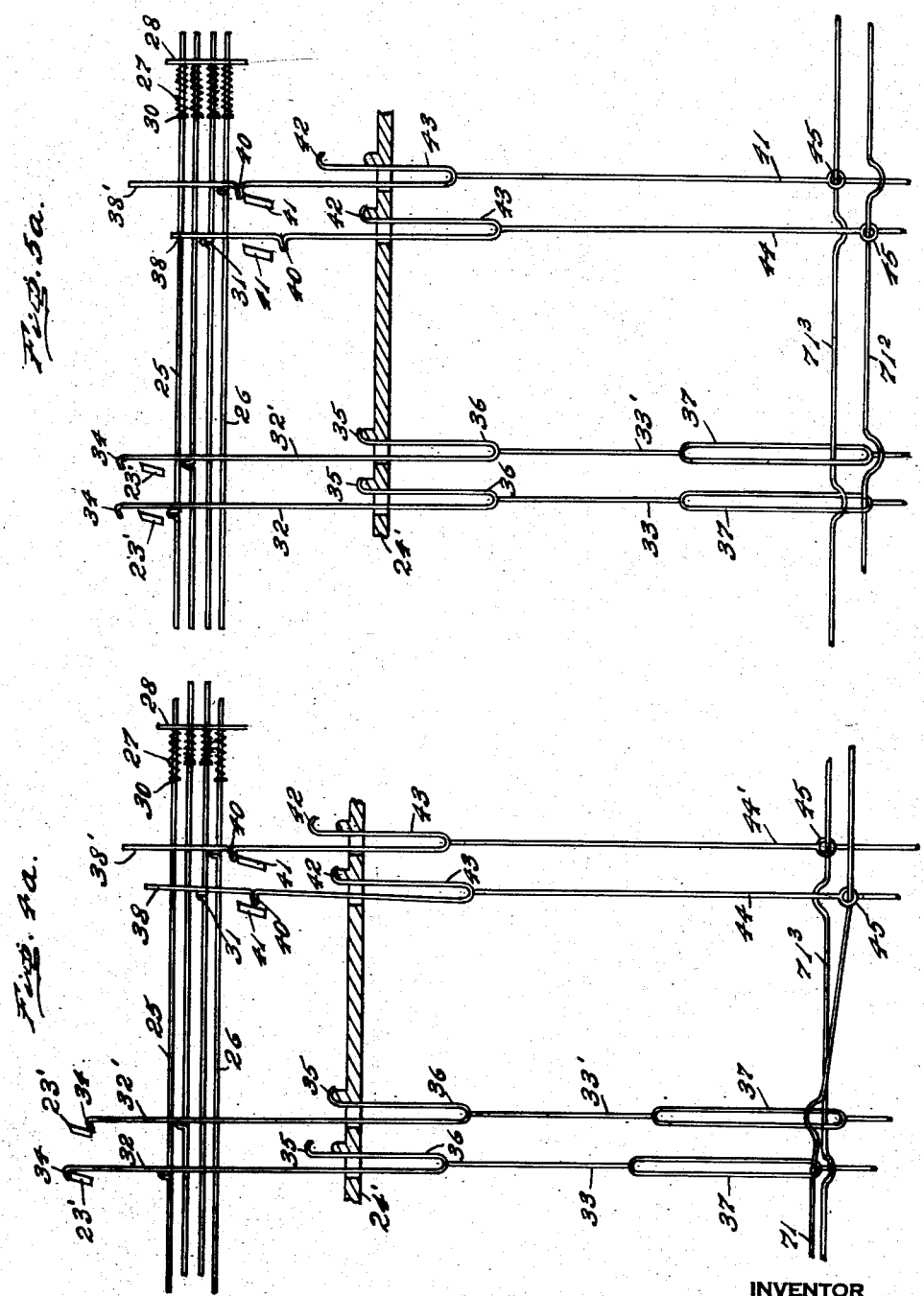

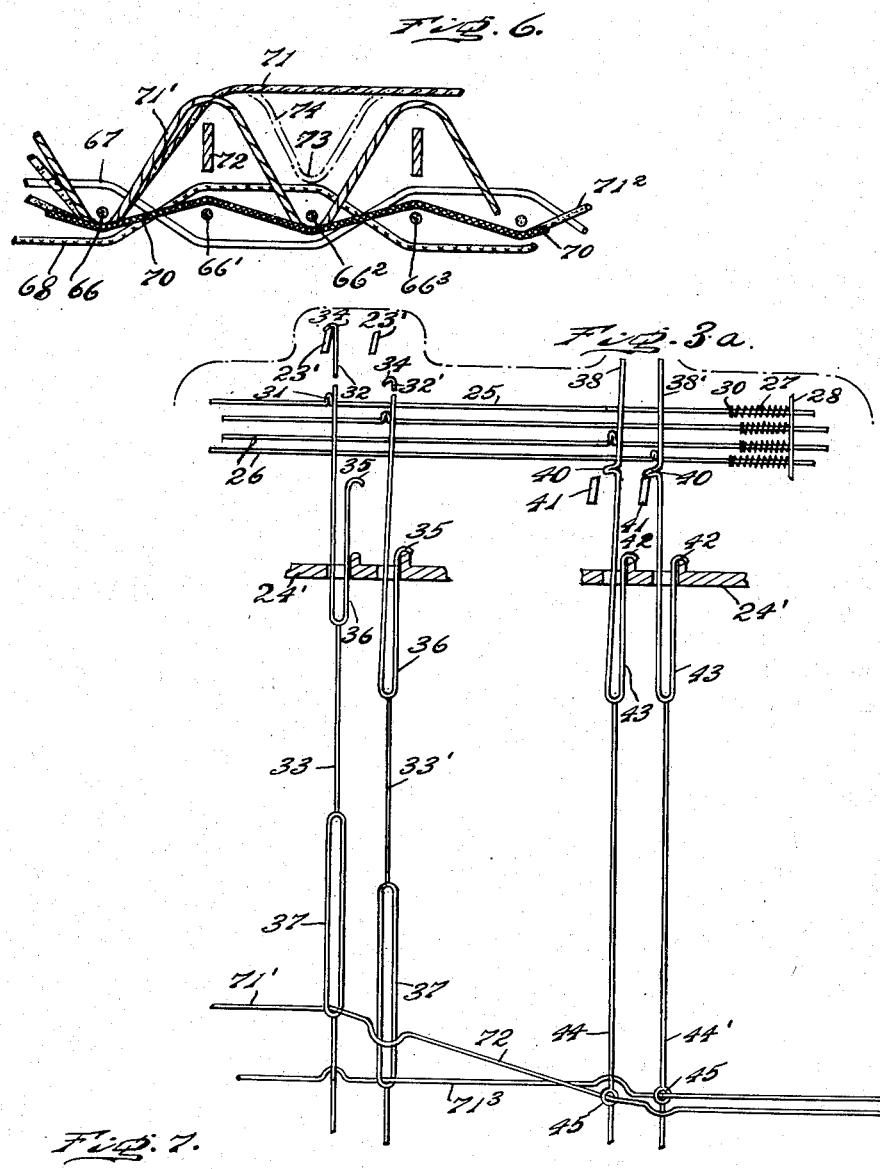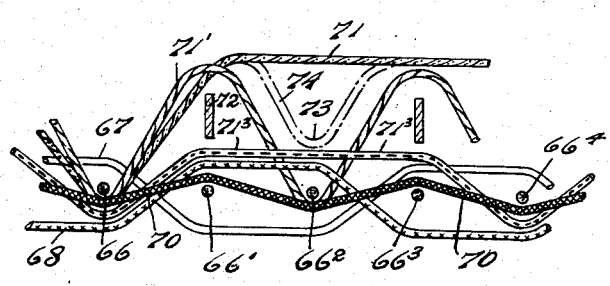

Aug. 25, 1953                JOHN HENRY HARDING,                2,649,862
                              GENERALLY KNOWN AS
                                HARRY J. HARDING
                           JACQUARD MECHANISM AND PROCESS
Filed June 17, 1952                                         6 Sheets-Sheet 6
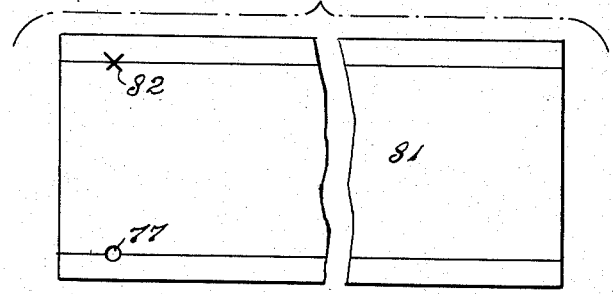
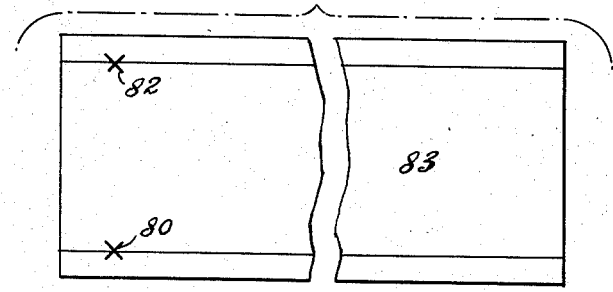
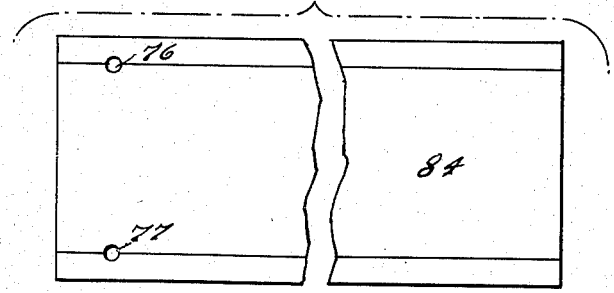
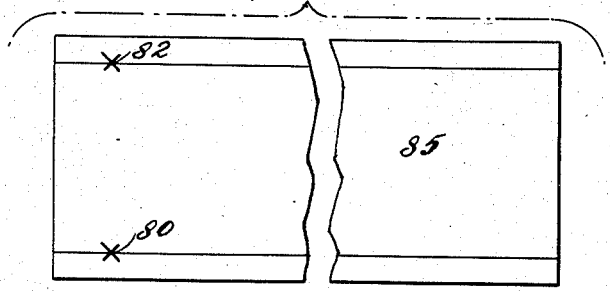
INVENTOR
John Henry Harding
generally known as
BY Harry J. Harding
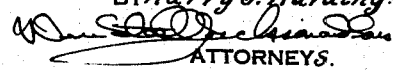
ATTORNEYS.

Patented Aug. 25, 1953

2,649,862

UNITED STATES PATENT OFFICE 2,649,862

JACQUARD MECHANISM AND PROCESS

John Henry Harding, generally known as Harry J. Harding, Philadelphia, Pa., assignor to C. H. Masland & Sons, Carlisle, Pa., a corporation of Pennsylvania Application June 17, 1952, Serial No. 293,978

14 Claims. (Cl. 139—59)

The present invention relates to jacquard mechanism for warp pile looms and methods of jacquard weaving.

A purpose of the invention is to simplify the creation of float pile warp ends to create novel effects in pile fabrics such as carpets and rugs.

A further purpose is to accomplish the selection of float pile warp ends by the same card which selects pile warp ends raised in the ordinary pile.

A further purpose is to employ a separate set of selector needles and hooks for selecting float pile warp ends.

A further purpose is to provide lash selector portions and float selector portions on the same card, to select the lash pile warp ends by lash selector holes and to select the float pile warp ends by float selector holes in the same card.

A further purpose is to provide, on each lash hook, lash knife hook ends cooperating with a lash knife for selection of the pile, comberboard hook ends engaged by the comberboard and long slots for supporting the pile warp ends.

A further purpose is to provide, on float hooks located more remote from the fell than the lash hooks, float knife hook ends for selectively cooperating with the float knife, comberboard hook ends for cooperation with the comberboard and eyes to support and manipulate the pile warp ends.

A further purpose is to group the float hooks and lash hooks in pairs and manipulate a given pile warp end by a pair of such hooks.

A further purpose is to select from the card the lash hooks and the float hooks which are to be preferred, to raise the selected lash hooks by the lash knife, to raise the rejected lash hooks and all of the float hooks by the comberboard, securing the selected float hooks by engagement of the float knife with the float knife hook ends on the selected float hooks, and subsequently, when lowering the lash hooks and the rejected float hooks, to hold the selected float hooks in elevated position, thereby raising the selected float pile warp ends in the long slots of the corresponding lash hooks.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is a fragmentary diagrammatic side elevation of a jacquard mechanism in accordance with the invention. The mechanism shown in this figure is conventional.

Figures 2 to 5 are enlarged diagrammatic views of the selector mechanism and hooks employed in the jacquard mechanism of the invention.

Figures 3a to 5a are views similar to Figures 3 to 5 showing the jacquard mechanism in different positions.

Figure 6 is a conventional warpwise weave diagram showing the weave of the invention and illustrating steps involved in the weave of Figures 2 to 5.

Figure 7 is a view similar to Figure 6 showing a modification.

Figure 8 is a view similar to Figure 6 showing a further modification.

Figures 9 to 14 show various cards useful in the invention.

Describing in illustration but not in limitation and referring to the drawings:

In order to create novel effects in warp pile fabrics such as carpets and rugs, it is desirable not only to employ pile raised over a wire and then immediately bound in the weave behind the next weft, but it is very desirable also to create variations by introducing floats, that is pile warp ends which remain in or above the face of the fabric without being bound in the weave for a spacing corresponding to the distance between more than one intervening weft. For example if the normal pile is bound behind every second weft, float pile warp ends may be bound behind every fourth, sixth, eighth, etc. weft. It is also desirable to be able to produce floats which are raised over wires and also floats which are beneath the wires but nevertheless at the face of the fabric. The floats which are raised over wires are ordinarily called high floats and the floats which are at the face of the fabric but beneath the wires are known as low floats. The floats which are raised over a wire at one end and at the face of the fabric but not raised over a wire at the other end are called intermediate floats.

In accordance with the present invention floats of any suitable character and extending to any desired length are created by a small modification of a conventional jacquard mechanism, without the necessity of slowing up the weave or the operation of the jacquard, and without seriously complicating the jacquard.

In accordance with the invention each pile warp end is manipulated by two jacquard hooks instead of one. The lash hooks manipulate the pile at the point at which a wire is inserted, while the float hooks control the pile at the position of the next weft. The lash hooks are desirably placed nearest to the fell and provided with long slots so that the float hooks can nevertheless raise the pile to create floats when lash hooks are down.

In accordance with the invention, at the point of insertion of the front weft (above the stuffer) the lash hooks and float hooks are all down and the cylinder and card are out of engagement with the jacquard needles. After the front weft is inserted, the cylinder and card move into selecting position and lash needles are manipulated for selecting and rejecting lash hooks, while float needles are manipulated for selecting and rejecting float hooks. The lash knife is then fully raised, raising the selected lash hooks and raising the selected pile warp ends in the long slots of the lash hooks. The comberboard also moves up, but, as in current practice, moves a distance less than the distance of movement of the lash knife and usually one-half the distance of the lash knife, so that where the lash knife moves up and down 9 inches in its full stroke the comberboard moves up and down 4½ inches. In moving up, the comberboard raises the rejected lash hooks and all of the float hooks one-half way, thus raising half way the pile warp ends which are not selected. After the wire has been inserted in the upper shed and a shot of weft has been inserted in the lower shed, the lash knife and comberboard move down, lowering the selected lash hooks and lowering the rejected lash hooks and the rejected float hooks. In the meantime however the selected float hooks are held in raised position by a float knife. When the next shot of weft is inserted, therefore, it is beneath the float pile warp ends.

The question of whether the float pile warp ends are high or low is determined by the question of whether they are carried under wires at both ends, over wires at both ends, or under a wire at one end and over a wire at the other end. This selectivity is merely a matter of punching the desired float holes in the card.

Figure 1 illustrates a conventional jacquard mechanism which is slightly modified to conform with the present invention. The jacquard consists of an upper frame 20 mounting a jacquard mechanism 21 having end frames 22 in which are vertical slidably mounted an upper grid 23 and a lower grid 24. The jacquard mechanism comprises lash needles 25 (only two are shown) and float needles 26 (only two are shown) which are suitably mounted for reciprocation, and urged toward the card by spiral compression springs 27 acting from a spring abutment 28 against projections 30 on the needles as well known. Each of the needles has a selecting projection 31 which extends out into the path of a cooperating hook to deflect the hook when the needle is displaced. A jacquard cylinder 29 carries a succession of cards 29' which engage the needles when the cylinder is moved in against them as well known. The mechanism here under discussion is of the character in which the needle is selected by punching a hole in the card which allows the needle to retain the selecting position when the card moves in toward the needles, whereas the needle is rejected by failing to punch a hole in the card at that point, in which case the needle is deflected to the right in Figures 2 to 5, moving it from its normal position to a position of rejection.

Each of the lash needles 25 cooperates with one of the lash hooks 32 or 32' suitably of resilient metal wire (there is a lash needle and a lash hook for every pile end in the fabric) and the lash hooks are suitably guided to move up and down and extend down into the loom to support lingoe heddles 33 and 33'. Each lash hook (with its lingoe heddle) includes suitably at the top a lash knife hook end 34, which in selected position at a proper stage in the weave hooks over lash knife 23' which forms part of the upper grid 23.

Each lash hook also has, suitably below the lash knife hook end, a comberboard hook end 35 which is conveniently formed on a branch 36 of the lash hook so that adequate lateral flexibility of the lash hook is retained. This engages at proper positions over the comberboard 24' which forms part of the lower grid 24. At its lower end each lash hook (or its lingoe heddle) has a long slot 37 which at its bottom receives and manipulates a pile warp as later explained.

Preferably on the side of the jacquard mechanism remote from the fell with respect to the lash hooks, a set of float hooks 38 and 38' are positioned in suitable guides (not shown) to permit movement up and down. There is one float hook for each pile warp end which is to form a float at any point in the fabric, and normally the hooks are in pairs, one float hook being paired with one lash hook and both manipulating the same pile warp end. The float hooks are operatively moved in selection by the float needles 26 through the selector projections 31.

Each float hook has at a suitable point near the upper end a float knife hook end 40 formed thereon and engaging over a desirably stationary float knife 41 cooperating with the float knife hook end when the float hook is selected to hold the float hook in raised position while other float hooks move down. It is convenient to place the float knife immediately beneath the needles, although it may be at any suitable position along the float hooks which does not interfere with the comberboard or with the lash knife.

The float hooks have comberboard hook ends 42 which at proper positions hook over the comberboard, and are suitably mounted on branches 43 similar to the branches 36.

The float hooks at their lower ends carry lingoe heddles 44 and 44' which carry yarn guiding eyes 45, 45. The bottoms of the long slots and the eyes will suitably be at the same level in lowermost position for all lingoe heddles, but for convenience in showing the pile warp ends, to prevent one lying above another, the positions of the respective long slots and eyes have been slightly displaced vertically in Figures 2 to 5.

The card cylinder 29 is reciprocated back and forth with respect to the adjoining ends of the needles. The card cylinder 29 is mounted for intermittent rotation in the usual manner in bearings 46 carried on the ends of axially movable rods 47 slidably mounted in sliding bearings 48 in the frame 22 of the jacquard mechanism, and the usual hooks 50 are provided for turning the cylinder one step at a time for each reciprocation of the cylinder toward and away from the needles 25 and 26.

The cylinder is reciprocated by operating rods 51 connected at one end to the housings of bearings 46 on the cylinder supporting rods 47, the opposite ends of the operating rods 51 being connected to the outer ends of levers 52. The levers 52 are fixed on a rock shaft 53 rotatably mounted in a frame 54 supported by the superstructure 20.

On the rock shaft 53 is a lever 55 the other end of which is operatively connected to a suitable link 56 driven by the loom as well known in the art.

The lash knife and the comberboard are coupled together and operated in unison with differential rise and fall between the lash knife and the comberboard so that the lash knife has twice the stroke of the comberboard as well known in the art. The upper grid 23 carrying the lash knife 23' is pivotally connected at each of its opposite ends by links 57 to one end of each of the levers 58 mounted on and rockable with a rock shaft 60 having bearing support on the frame 54. An opposite end on one lever 58 is pivotally connected to a link 61 for operation of the lash knife from the loom in the well known manner.

The lower grid 24 having the comberboard 24' is operatively connected at each of its ends by a link 62 to one end of each of the levers 63. The levers 63 are rigidly secured to a rock shaft 64 which is rotatably mounted in the frame 54. One of the levers 63 is provided at its opposite end with an operating link 65 which pivotally connects to the outer end of one lever 58.

Considering now the weave of Figure 6 as produced by the jacquard mechanism of Figures 2 to 5, it will be evident in Figure 6 that at the position at which weft shot 66 is inserted, binder warp 67 is raised half way by reason of raising its binder warp heddle, binder warp 68 is lowered by reason of lowering its binder warp heddle, stuffer warp 70 is lowered by reason of lowering the stuffer warp heddle, and in this particular instance all of the pile warp ends are lowered (although as explained later any desired number may in the weave of the invention be floating at this position). Figure 2 illustrates the jacquard and lingoe heddle positions immediately prior to insertion of weft shot 66. The card and cylinder do not engage the needles. In this view lash knife 23' is fully down, reaching a position below lash knife hook ends 34 on the lash hooks 32 and 32'. Comberboard 24' is in its lowermost position. In this particular case lash hooks 32 and 32' and float hooks 38 and 38' are all down, and pile warp end 71 threaded through the long slot 37 of lash hook 32 and through the eye 45 of float hook 38 is down, as well as pile warp end 71' threaded through long slot 37 of lash hook 32' and eye 45 of float hook 38'.

In the next step, corresponding to that at which weft shot 66' is inserted in Figure 6, it will be evident that binder warp 68 is raised by raising the binder warp heddle, binder warp 67 is lowered by lowering the binder warp heddle, and stuffer warp 70 is raised by raising the stuffer warp heddle. Certain pile warp ends are selected and certain other pile warp ends are rejected. The selected pile warp ends at this position which are to go over the wire and form the normal pile are here designated as 71' and those which are to go over the wire and form high floats are designated as 71. Any rejected pile warp ends $71^2$ are raised half way in this position, with the stuffer warp.

Thus it will be evident that those pile warp ends which are fully raised in the position of Figure 3 may among other possibilities form either normal pile warp ends or high float ends.

After the insertion of weft 66 in Figure 6, the cylinder 29 indexes to bring the next card 29' into controlling position, and moves into engagement with the needles at the left of Figure 3. By this movement the card controls not only the position of the pile warp ends at the point at which weft 66' is inserted, but also controls the position of the pile warp ends when the next weft $66^2$ is inserted. A hole in the card receives the needle controlling lash hook 32, which is typical of all of the lash hooks which are selected. Lash knife 23' is raised at this point as well known, and it engages and raises all selected lash hooks 32, bringing pile warp ends 71 and 71' which are selected into upper position above the position of the wire 72. No holes in the card are available to receive the needles controlling rejected lash hooks 32', and therefore when the lash knife moves up, lash hooks 32' are passed by the lash knife and are not raised by it. However, the comberboard hook ends 35 of the rejected lash hooks 32' are engaged by the comberboard which moves up at this time half the distance through which the lash knife moves. Accordingly rejected pile warp ends $71^2$ are raised half way at this point.

The same card which controls the lash hooks also controls the float hooks. A hole in the card receives each of the float hook needles which controls float hooks 38 which are selected, and the comberboard hook ends 42 of the float hooks rising with the comberboard carry the float hooks half way up and engage the float knife hook ends 40 of float hooks 38 over stationary knife 41.

At the same time there are no holes in the cards to receive needles controlling float hooks 38' and therefore, when the cylinder 29 moves in with the card, rejected float hooks 38' are deflected by the needles as shown in Figure 3 so that, when the hooks move up with the comberboard, float knife hook ends 40 of hooks 38' do not engage over stationary knife 41, but remain free to lower when the comberboard lowers.

With the warps in this position, wire 72 is inserted in the upper shed under all selected pile warp ends 71 and 71' and above binder warp 68, rejected pile warp ends $71^2$, stuffer warp 70 and binder warp 67. Weft 66' is inserted in the lower shed above binder warp 67 and beneath all other warps.

After weft 66' is inserted and before weft $66^2$, the jacquared mechanism is in the position of Figure 4. As seen from Figure 6, binder warp 68 is still raised half way due to raising the binder warp heddle half way, binder warp 67 is still lowered due to lowering the binder warp heddle, and stuffer warp 70 is lowered by lowering the stuffer warp heddle. The cylinder 29 is still in against the needles with the same card in place as in Figure 3, so that the needles are in the same selector position. Lash knife 23' moves down and carries with it selected lash hooks 32 bringing selected pile warp ends 71 and 71' down as shown. The comberboard moves down likewise to its lowermost position and brings rejected lash hooks 32' down by engagement of the comberboard hook ends 35 over the comberboard.

As the comberboard moves down in Figure 4, the rejected float hooks 38' move down with it, but the selected float hooks 38 stay up, holding the float in half raised position as indicated at 73 in Figures 6 and 7. The float 71 thus does not go under the weft $66^2$. If it is a high float it loops down as indicated at 74 by dot-and-dash lines, while if it is a low float it remains in the half raised position. The result is that the float is above or at the face of the fabric.

The result of this readjustment of the jacquard hooks is shown in Figure 5, in which the comberboard 24' and lash knife 23' have moved fully down, the lash hooks 32 and 32' are in lower position, the rejected float hooks 38' are in lower position, but selected float hooks 38 are in elevated position held by float knife 41. Float pile warp ends 71 are raised by eyes 45 on selected float hooks 38, pile warp ends 71 raising in long slots 37 of lash hooks 32. In this position and normally while the cylinder and card are still in place against the needles (Figure 5 shows the position just after the cylinder and card have moved out from the needles), with the float pile warp ends raised half way, binder warp 68 raised half way, rejected pile warp ends 71$^2$ lowered, the stuffer warp 70 lowered and binder warp 67 lowered, a shot of weft 66$^2$ is inserted beneath the selected float pile warp ends 71 and the binder warp 68 and above all other warps. As soon as this pick is taken, the cylinder and card move out as well known, the cylinder turns and indexes the next card as well known and is ready to move in again to establish the condition of Figure 3 for the next cycle. Thus Figure 5 corresponds to Figure 2 except that there are selected float ends in Figure 5, while no selected float ends are present in Figure 2. It will be evident of course that there will or will not be selected float ends in any position corresponding to Figure 5 or Figure 2 depending upon whether the card has openings to select float ends in the positions of Figures 3 and 4 as dictated by the pattern.

The final result will depend upon the sequence through which a particular pile warp end passes in the position of Figures 2 to 5 inclusive. For a high float the following sequence exists:

1. Particular pile warp end is lowered in the position of Figure 2 (weft 66) like pile warp ends 71.

2. Particular pile warp end is fully raised in the position of Figure 3 (weft 66') like pile warp ends 71.

3. Particular pile warp end is half raised in the position of Figures 4 and 5 (weft 66$^2$) like pile warp ends 71.

4. Particular pile warp end is fully raised in position of Figure 3 (weft 66$^3$) like pile warp ends 71. (This sequence of Figures 4, 5 and Figure 3 goes on over as many wires as desired until the end of the float is reached.)

5. At the end, the particular pile warp end is lowered in the position of Figure 2 like pile warp ends 71.

Figures 9 and 10 show the portions of the cards which create this high float. Card 75 has lash hole 76 which causes the pile warp end to be raised to the high position over the first wire in Figure 3, and has float hole 77 which causes the pile warp end to form a float as in Figures 4 and 5. The next card 78 has lash hole 76 which causes the pile warp end to be raised to the high position over the next wire in Figure 3, and has a float blank 80 which causes the pile warp end to be bound behind the next weft, ending the float.

In some cases a low float 71$^3$ is desired as shown in Figure 7. To produce a low float, weft 66 is inserted as shown in Figure 2.

After the insertion of weft 66 in Figure 7, the cylinder 29 indexes to bring the next card 29' into controlling position, and moves into engagement with the needles at the left of Figure 3a.

By this movement the card controls not only the position of the pile warp ends at the point at which weft 66' is inserted, but also controls the position of the pile warp ends when the next weft 66$^2$ is inserted. A blank in the card prevents entry of the needle controlling lash hook 32' which is typical of all the lash hooks which are to form low floats, and therefore when the lash knife 23' moves up lash hooks 32' are passed by the knife and are not raised by it. A hole in the card receives the needle controlling lash hook 32 which is typical of the selected lash hooks, and as the lash knife is raised at this point as well known, it engages all of the lash hooks 32, bringing pile warp ends 71 and 71' which are selected into upper position above the position of the wire 72. The low float lash hooks 32' are engaged by the comberboard, which moves up at this time half the distance through which the lash knife moves. Accordingly the low float pile warp ends 71$^3$ are raised half way.

The same card which controls the lash hooks also controls the float hooks. A blank in the card positions engages each of the float hook needles which control float hooks 38 which are rejected so that the rejected float hooks when carried up by the comberboard are deflected and their float hook knife ends 40 do not engage over the stationary knife 41, but remain free to lower when the comberboard lowers. A hole in the card receives each of the float hook needles which controls float hooks 38' which are selected, and the comberboard hook ends 42 of the float hooks rise with the comberboard carrying the float hooks 38' half way up and engage the knife hook ends 40 of the float hooks 38' over stationary knife 41.

With the warps in this position, wire 72 is inserted in the upper shed under all selected pile warp ends 71 and 71', above binder warp 68, low float pile warp ends 71$^3$, any rejected pile warp ends, stuffer warp 70 and binder warp 67. Weft 66' is inserted in the lower shed above the binder warp 67 and above all other warps.

After weft 66' is inserted and before the insertion of weft 66$^2$, the jacquard mechanism is in the position of Figure 4a. As seen from Figure 7, binder warp 68 remains raised half way due to raising the binder warp heddle half way, binder warp 67 remains lowered due to lowering the binder warp heddle, and stuffer warp 70 is lowered by lowering the stuffer warp heddle. The cylinder 29 is still in against the needles with the same card in place as in Figure 3a so that the needles are in the same selector position. Lash knife 23' moves down and carries with it selected lash hooks 32, bringing selected pile warp ends 71 and 71' down as shown. The comberboard moves down likewise to its lowermost position and brings low float lash hooks 32' down by engagement of the comberboard hook ends 35 over the comberboard. As the comberboard moves down in Figure 4a, rejected float hooks 38 move down with it, but the selected float hooks 38' stay up, holding the low float in half raised position as indicated in Figure 7. The low float 71$^3$ thus does not go under the weft 66$^2$, but remains at the face of the fabric.

The result of thus readjusting the jacquard hooks is shown in Figure 5a in which the comberboard 24' and the lash knife 23' have moved fully down, the lash hooks 23 and 23' are in lowered position, the rejected float hooks 38 are in lowered position, but the selected float hooks 38' are in elevated position held by float knife 41. Float pile warp ends 71³ are raised by eyes 45 on the selected float hooks 38′, the pile warp ends 71³ raising in long slots 37 of lash hooks 32′. In this position and normally while the cylinder and card are still in place against the needles, with the float pile warp ends raised half way, binder warp 68 raised half way, rejected pile warp ends 71² lowered, the stuffer warp 70 lowered and binder warp 67 lowered, a shot of weft 66² is inserted beneath the selected float pile warp ends 71³ and the binder warp 68 and above all other warps. As soon as this pick is taken, the cylinder and card as well known move out, the cylinder turns and indexes the next card as well known and is ready to move in again to establish the condition of Figure 3a by the next cycle.

In summary, to obtain a low float 71³ the following sequence is used:

1. Particular pile warp end is lowered in the position of Figure 2 (weft 66) like pile warp ends 71.
2. Particular pile warp end is raised half way in the position of Figure 3a (weft 66′) like pile warp ends 71³.
3. Particular pile warp end is helf raised in the position of Figures 4a and 5a (weft 66²) like pile warp ends 71³ in these figures.
4. Particular pile warp end is raised half way in the position of Figure 3a (weft 66³) like pile warp ends 71³. (This sequence of Figures 4a, 5a and Figure 3a goes on beneath as many wire positions as it is desired to carry the float until the end is reached.)
5. At the end, the particular pile warp end is lowered in the position of Figure 2 like pile warp ends 71² in Figure 5a.

Figures 11 and 12 show the portions of the cards which create this low float 71³ of Figure 7. Card 81 has lash blank 82 which causes the pile warp end to be raised half way in the position of Figure 3a and has float hole 77 which causes the pile warp end to form a float as in Figures 4a and 5a. The next card 83 has a lash blank 82 which causes the pile warp end to be raised half way in the position of Figure 3a and has a float blank 80 which causes the pile warp end to be bound behind the next weft 66⁴ ending the float.

In some cases it is desirable to use intermediate floats 71⁴ as shown in Figure 8, which pass over a wire at one end and under a wire at the other end. To make intermediate floats the sequence will be as follows:

1. Particular pile warp end is lowered in the position of Figure 2 like pile warp ends 71 at weft 66.
2. Particular pile warp end is fully raised in the position of Figure 3 (weft 66′) like pile warp ends 71.
3. Particular pile warp end is half raised in the position of Figures 4 and 5 (weft 66²) like pile warp ends 71 in these figures.
4. A particular pile warp end is raised half way in the position of Figure 3a (weft 66³) like pile warp ends 71³ (any desired sequence of Figures 4a, 5a and Figure 3a (or Figures 4, 5 and Figure 3) goes on raising the warp over some wires and under other wires or vice versa if desired or continuing the pile warp as a low float until the end is reached). At the end of the float the particular pile warp end is lowered in the position of Figure 2 like pile warp ends 71.

Figures 13 and 14 show the cards necessary to create the intermediate float 71⁴ of Figure 8. On card 84 lash needle hole 76 selects the pile warp end to go over the wire at weft 66′, while float needle hole 77 determines that this pile warp end shall float at weft 66². The next card 85 has lash needle blank 82 which determines that the pile warp end passes under the wire at the position of weft 66³, and float blank 80 which determines that the float shall be bound behind the weft at weft 66⁴.

It will be understood of course that intermediate floats may start out as low floats and end as high floats rather than starting as high floats and ending as low floats as in Figure 8.

It will further be evident that individual floats may be made of one or a plurality of adjoining pile warp ends of the same or of different colors as desired. In other words the float may be a single pile warp end wide, or it may extend for a width of several pile warp ends.

It will further be evident that as shown by Figures 7 and 8, high floats, low floats and intermediate floats may exist weftwise of the fabric at the same weft position, thus giving rise to various heights of pile in the same transverse row.

The final result will be the creation of high floats which will suitably extend over two or more spaced wires and be bound beneath wefts on the other sides of the outermost wires of the float. Likewise as shown in Figure 7 low floats are created which will extend over three or more wefts and be bound behind wefts on either side. It will be understood that the low floats may be used without the high floats or the high floats without the low floats.

Furthermore the high floats will form either loops or tufts depending upon whether the wires are noncutting wires or cutting wires and it will be understood that I contemplate the use of cutting wires, noncutting wires and combinations thereof. It will also be understood that I contemplate the creations of patterns by wires having high and low portions thereon within the shed, the high points being located differently on different wires. It will also be understood that I contemplate the use of wires having such high and low portions alternating with straight wires of any relative height, cutting and noncutting in different cases.

It will be evident that by choosing combinations of the position of the pile warp ends where the wire is inserted and the position of the pile warp ends where the next weft is inserted (the float position) and the position of the pile warp ends where the next wire is inserted, I can dictate the creation of high, low and intermediate floats as desired.

In view of my invention and disclosure variations and modifications to meet individual whim or particular need will doubtless become evident to others skilled in the art, to obtain all or part of the benefits of my invention without copying the process and apparatus shown, and I, therefore, claim all such insofar as they fall within the reasonable spirit and scope of my claims.

Having thus described my invention what I claim as new and desire to secure by Letters Patent is:

1. In a jacquard for a loom, a card cylinder, cards therefor, lash selector needles and float selector needles cooperating with the cards, lash hooks operatively connected to the lash selector needles, said lash hooks having lash knife hook ends and comberboard hook ends, float hooks operatively connected to the float selector needles including float knife hook ends and comberboard hook ends, each float hook being paired with a lash hook which manipulates the same pile warp on the loom, a lash knife, means for moving the lash knife up and down in position to selectively engage and raise lash hooks, a comberboard, means for moving the comberboard up and down through a lesser distance than the movement of the lash knife for raising lash hooks and float hooks and a float knife selectively engaging float hooks and holding the same in raised position while other float hooks are in lowered position.

2. In a jacquard mechanism for a loom, a card cylinder, cards therefor, lash needles and float needles operatively engaging the cards, lash hooks operatively engaged by the lash needles and having upper lash knife hook ends and lower comberboard hook ends, float hooks operatively engaged by the float needles and each having upper float knife hook ends and lower comberboard hook ends, each float hook being paired with a lash hook to manipulate the same pile warp end on the loom, a lash knife movable up and down selectively engaging the lash knife hook ends on the lash hooks and raising selective lash hooks, means for raising and lowering the lash knife, a comberboard, means for raising and lowering the comberboard through a range of motion less than the range of motion of the lash knife and thereby raising rejected lash hooks and the float hooks by the comberboard hook ends, and a float knife selectively engaging float knife hook ends on selected float hooks and holding the selected float hooks in raised position when other float hooks and the lash hooks are in lowered position.

3. In a jacquard mechanism for a loom, a card cylinder, cards therefor, lash needles and float needles operatively engaging the cards, lash hooks operatively engaged by the lash needles and having upper lash knife hook ends and lower comberboard hook ends, float hooks operatively engaged by the float needles and each having upper float knife hook ends and lower comberboard hook ends, each float hook being paired with a lash hook to manipulate the same pile warp end on the loom, a lash knife movable up and down selectively engaging the lash knife hook ends on the lash hooks and raising selective lash hooks, means for raising and lowering the lash knife, a comberboard, means for raising and lowering the comberboard through a range of motion less than the range of motion of the lash knife and thereby raising rejected lash hooks and the float hooks by the comberboard hook ends, and a stationary float knife engaging float knife hook ends of selected float hooks and holding the same in elevated position while other float hooks and the lash hooks are in lowered position.

4. In a jacquard mechanism for a loom, lash needles, float needles, a cylinder and cards operatively associated with the needles, lash hooks operatively connected to lash needles having lash knife hook ends, comberboard hook ends and long slots for holding and manipulating pile warp ends, float hooks operatively associated to float needles and including float knife hook ends, comberboard hook ends and eyes, each of the float hooks being associated with one of the lash hooks to form a pair manipulating a pile warp end by the long slot of a lash hook and the eye of a float hook, a lash knife operatively associated with the lash knife hook ends of the lash hooks which are selected, means for raising the lash knife and thereby raising the selected lash hooks and for lowering the lash knife, a comberboard engaging the comberboard hook ends, means for raising and lowering the comberboard through a shorter range of motion than the range of motion of the lash knife and thereby raising rejected lash hooks and the float hooks, and a float knife positioned at an upper position of the float hooks and operatively engaging selected float hooks for holding the same in the upper position.

5. In a jacquard mechanism for a loom, lash needles, float needles, a cylinder and cards operatively associated with the needles, lash hooks operatively connected to lash needles having lash knife hook ends, comberboard hook ends and long slots for holding and manipulating pile warp ends, float hooks operatively associated to float needles and including float knife hook ends, comberboard hook ends and eyes, each of the float hooks being associated with one of the lash hooks to form a pair manipulating a pile warp end by the long slot of a lash hook and the eye of a float hook, a lash knife operatively associated with the lash knife hook ends of the lash hooks which are selected, means for raising the lash knife and thereby raising the selected lash hooks and for lowering the lash knife, a comberboard engaging the comberboard hook ends, means for raising and lowering the comberboard through a shorter range of motion than the range of motion of the lash knife and thereby raising rejected lash hooks and the float hooks, and a stationary float knife operatively engaging the float knife hook ends of selected float hooks and holding the same in elevated position.

6. In a jacquard mechanism for a loom, lash needles, float needles, a cylinder and cards operatively associated with the needles, lash hooks operatively connected with the lash needles and having upper lash knife hook ends, intermediate comberboard hook ends and lower long slots adapted to hold and manipulate pile warp ends, float hooks operatively connected to float needles and having upper float knife hook ends, intermediate comberboard hook ends and lower eyes for manipulating pile warp ends, the float hooks being arranged in pairs with the lash hooks, each pair supporting and manipulating a single pile warp end, a lash knife operatively associated with the lash knife hook ends of selected lash hooks to raise selected lash hooks, a comberboard operatively engaging the comberboard hook ends, a float knife engaging the float knife hook ends of selected float hooks, means for lowering the lash knife and the comberboard and moving the cylinder and one card away from the needles, means for moving the cylinder and another card into engagement with the needles and thereby selecting lash needles and float needles, means operative while the cylinder and card are in engagement for raising the lash knife with the selected lash hooks, means operative while the cylinder and card are in engagement for raising the comberboard through a lesser range of movement than the lash knife and thereby raising the rejected lash hooks half way and raising the float knife hook ends of the float hooks to a position above the float knife, engaging selected float hooks over the float knife, means operative while the cylinder and card are in selecting position for lowering the lash knife to its original position and thereby lowering the selected lash hooks, and means operative while the cylinder and card are in selecting position for lowering the comberboard to its original position and thereby lowering the rejected lash hooks and the rejected float hooks, while retaining the selected float hooks in elevated position by engagement of the float knife hook ends of the selected float hooks over the float knife, thereby raising float pile warp ends in the long slots of corresponding lash hooks.

7. The process of manipulating pile warp ends in a jacquard mechanism using lash hooks and float hooks for manipulating the same pile warp ends, which comprises lowering the lash hooks and all float hooks except selected float hooks while maintaining the selected float hooks raised, selecting lash hooks and float hooks which are to be raised, fully raising the selected float hooks and raising the rejected float hooks and all lash hooks half way, lowering the selected lash hooks, lowering the rejected lash hooks and the rejected float hooks, and holding the selected float hooks in raised position.

8. The method of manipulating the pile warp ends by a jacquard having lash hooks provided with long slots and float hooks provided with eyes and associated in pairs with the lash hooks nearer the fell to manipulate the same pile warp ends, which comprises lowering rejected float hooks and rejected lash hooks while maintaining selected float hooks in elevated position and raising selected float ends by the selected float hooks in the long slots of corresponding lash hooks, selecting lash hooks which are to be fully raised and float hooks which are later to be held in elevated position, fully raising the selected lash hooks, raising the rejected lash hooks and all the float hooks half way, lowering the selected lash hooks, lowering the rejected lash hooks and the rejected float hooks, and holding the selected float hooks in elevated position and thereby holding float pile warp ends up in the long slots of the lash hooks.

9. The method of weaving using lash hooks having long slots for supporting the pile warp ends and float hooks being operatively arranged in pairs, which comprises operatively disposing binder warp ends, lowering stuffer warp ends, lowering the lash hooks and at least some of the float hooks and thereby lowering pile warp ends and inserting a weft, reorienting binder warp ends, raising stuffer warp ends half way, selecting lash hooks to be fully raised and float hooks to be held up, fully raising selected lash hooks, raising rejected lash hooks and all float hooks half way, inserting a wire between the selected and rejected pile warp ends, inserting a shot of weft beneath the stuffer warp ends and above certain binder warp ends, lowering the stuffer warp ends, lowering the selected lash hooks, lowering the rejected lash hooks and the rejected float hooks, holding selected float hooks in elevated position and thereby raising float pile warp ends in the long slots of corresponding lash hooks and inserting a weft beneath float pile warp ends, beneath certain binder warp ends and above the stuffer warp ends and other pile warp ends.

10. The method of weaving, using lash hooks having long slots for supporting the pile warp ends and float hooks having eyes for supporting the pile warp ends, the lash hooks and float hooks being arranged in pairs, which comprises operatively disposed binder warp ends, lowering stuffer warp ends, lowering the lash hooks and at least some of the float hooks and thereby lowering pile warp ends, forming a lower shed and inserting a weft in the lower shed, reorienting binder warp ends, raising stuffer warp ends half way, selecting lash hooks to be raised half way and float hooks to be held up, raising lash hooks half way, raising float hooks half way, forming a lower shed, inserting a shot of weft in the lower shed, lowering the stuffer warp ends, lowering the lash hooks and the rejected float hooks, holding selected float hooks in elevated position and thereby raising float pile warp ends in the long slots of corresponding lash hooks, forming a lower shed, and inserting a weft in the lower shed beneath the float pile warp ends, beneath certain binder warp ends, and above the stuffer warp ends and other pile warp ends.

11. The method of weaving, using lash hooks having long slots for supporting the pile warp ends and float hooks having eyes for supporting the pile warp ends, the lash hooks and float hooks being arranged in pairs, which comprises operatively disposing binder warp ends, lowering stuffer warp ends, lowering the lash hooks and at least some of the float hooks and thereby lowering pile warp ends, forming a lower shed, and inserting a weft in the lower shed, reorienting binder warp ends, raising stuffer warp ends half way, selected lash hooks to be fully raised and float hooks to be held up, fully raising selected lash hooks, raising rejected lash hooks and all float hooks half way, inserting a wire between the selected and rejected pile warp ends, inserting a shot of weft beneath the stuffer warp ends and above certain binder warp ends, lowering the stuffer warp ends, lowering the selected lash hooks, lowering the rejected lash hooks and rejected float hooks, holding selected float hooks in elevated position and thereby raising float pile warp ends in the long slots of corresponding lash hooks and inserting a weft beneath float pile warp, beneath certain binder warp ends and above the stuffer warp ends and other pile warp ends, reorienting binder warp ends, raising stuffer warp ends half way, selecting any lash hooks to be fully raised and float hooks to be held up, fully raising selected lash hooks, raising rejected lash hooks and all float hooks half way, inserting a wire between the selected and rejected pile warp ends, inserting a shot of weft between the stuffer warp ends and above certain binder warp ends, lowering the stuffer warp ends, lowering the selected lash hooks, lowering the rejected lash hooks and the rejected float hooks, holding selected float hooks in elevated position and thereby raising float pile warp ends and inserting a weft beneath float pile warp ends, beneath certain binder warp ends and above the stuffer warp ends and other pile warp ends, individual float pile warp ends passing beneath one weft, over the wire at the next weft, over the next weft, over the wire at the next weft and beneath the next weft.

12. The method of weaving, using lash hooks having long slots for supporting the pile warp ends and float hooks having eyes for supporting the pile warp ends, the lash hooks and float hooks being arranged in pairs, which comprises operatively disposing binder warp ends, lowering stuffer warp ends, lowering the lash hooks and at least some of the float hooks and thereby lowering pile warp ends, forming a lower shed, and inserting a weft in the lower shed, reorienting binder warp ends, raising stuffer warp ends half way, selected lash hooks to be fully raised and float hooks to be held up, fully raising selected lash hooks, raising rejected lash hooks and all float hooks half way, inserting a wire between the selected and rejected pile warp ends, inserting a shot of weft beneath the stuffer warp ends and above certain binder warp ends, lowering the stuffer warp ends, lowering the selected lash hooks, lowering the rejected lash hooks and rejected float hooks, holding selected float hooks in elevated position and thereby raising float pile warp ends in the long slots of corresponding lash hooks and inserting a weft beneath float pile warp ends, beneath certain binder warp ends and above the stuffer warp ends and other pile warp ends, reorienting binder warp ends, raising stuffer warp ends half way, selecting any lash hooks to be fully raised and float hooks to be held up, fully raising selected lash hooks, raising rejected lash hooks and all float hooks half way, inserting a wire between the selected and rejected pile warp ends, inserting a shot of weft between the stuffer warp ends and above certain binder warp ends, lowering the stuffer warp ends, lowering the selected lash hooks, lowering the rejected lash hooks and the rejected float hooks, holding selected float hooks in elevated position and thereby raising float pile warp ends and inserting a weft beneath float pile warp ends, beneath certain binder warp ends and above the stuffer warp ends and other pile warp ends, individual float pile warp ends passing beneath one weft, between the next weft and the wire, above the next weft, between the next weft and the wire and beneath the next weft.

13. The method of weaving, using lash hooks having long slots for supporting the pile warp ends and float hooks having eyes for supporting the pile warp ends, the lash hooks and float hooks being arranged in pairs, which comprises operatively disposing binder warp ends, lowering stuffer warp ends, lowering the lash hooks and at least some of the float hooks and thereby lowering pile warp ends, forming a lower shed, and inserting a weft in the lower shed, reorienting binder warp ends, raising stuffer warp ends half way, selected lash hooks to be fully raised and float hooks to be held up, fully raising selected lash hooks, raising rejected lash hooks and all float hooks half way, inserting a wire between the selected and rejected pile warp ends, inserting a shot of weft beneath the stuffer warp ends and above certain binder warp ends, lowering the stuffer warp ends, lowering the selected lash hooks, lowering the rejected lash hooks and rejected float hooks, holding selected float hooks in elevated position and thereby raising float pile warp ends in the long slots of corresponding lash hooks and inserting a weft beneath float pile warp ends, beneath certain binder warp ends and above the stuffer warp ends and other pile warp ends, reorienting binder warp ends, raising stuffer warp ends half way, selecting any lash hooks to be fully raised and float hooks to be held up, fully raising selected lash hooks, raising rejected lash hooks and all float hooks half way, inserting a wire between the selected and rejected pile warp ends, inserting a shot of weft between the stuffer warp ends and above certain binder warp ends, lowering the stuffer warp ends, lowering the selected lash hooks, lowering the rejected lash hooks and the rejected float hooks, holding selected float hooks in elevated position and thereby raising float pile warp ends and inserting a weft beneath float pile warp ends, beneath certain binder warp ends and above the stuffer warp ends and other pile warp ends, individual float pile warp ends passing beneath one weft, over the wire at the next weft, above the next weft, between the next weft and the wire and beneath the next weft.

14. The method of weaving, using lash hooks having long slots for supporting the pile warp ends and float hooks having eyes for supporting the pile warp ends, the lash hooks and float hooks being arranged in pairs, which comprises operatively disposing binder warp ends, lowering stuffer warp ends, lowering the lash hooks and at least some of the float hooks and thereby lowering pile warp ends, forming a lower shed, and inserting a weft in the lower shed, reorienting binder warp ends, raising stuffer warp ends half way, selected lash hooks to be fully raised and float hooks to be held up, fully raising selected lash hooks, raising rejected lash hooks and all float hooks half way, inserting a wire between the selected and rejected pile warp ends, inserting a shot of weft beneath the stuffer warp ends and above certain binder warp ends, lowering the selected lash hooks, lowering the rejected lash hooks and rejected float hooks, holding selected float hooks in elevated position and thereby raising float pile warp ends in the long slots of corresponding lash hooks and inserting a weft beneath float pile warp ends, beneath certain binder warp ends and above the stuffer warp ends and other pile warp ends, reorienting binder warp ends, raising stuffer warp ends half way, selecting any lash hooks to be fully raised and float hooks to be held up, fully raising selected lash hooks, raising rejected lash hooks and all float hooks half way, inserting a wire between the selected and rejected pile warp ends, inserting a shot of weft between the stuffer warp ends and above certain binder warp ends, lowering the stuffer warp ends, lowering the selected lash hooks, lowering the rejected lash hooks and the rejected float hooks, holding selected float hooks in elevated position and thereby raising float pile warp ends and inserting a weft beneath float pile warp ends, beneath certain binder warp ends and above the stuffer warp ends and other pile warp ends, individual float pile warp ends passing beneath one weft, between the next weft and the wire, above the next weft, over the wire at the next weft and beneath the next weft.

JOHN HENRY HARDING,
*Generally known as Harry J. Harding.*

References Cited in the file of this patent

UNITED STATES PATENTS

| Number | Name | Date |
|---|---|---|
| 2,219,771 | Foster | Oct. 29, 1940 |
| 2,229,421 | Pivetz | Jan. 21, 1941 |
| 2,477,249 | Harding | July 26, 1949 |